(12) United States Patent
Hjelm

(10) Patent No.: US 8,925,997 B2
(45) Date of Patent: Jan. 6, 2015

(54) AERODYNAMIC DEVICE FOR A VEHICLE

(75) Inventor: Linus Hjelm, Göteborg (SE)

(73) Assignee: Volvo Lastvagnar AB, Göteborg (SE)

(*) Notice: Subject to any disclaimer, the term of this patent is extended or adjusted under 35 U.S.C. 154(b) by 0 days.

(21) Appl. No.: 14/119,455

(22) PCT Filed: May 31, 2011

(86) PCT No.: PCT/SE2011/000108
§ 371 (c)(1),
(2), (4) Date: Nov. 22, 2013

(87) PCT Pub. No.: WO2012/166023
PCT Pub. Date: Dec. 6, 2012

(65) Prior Publication Data
US 2014/0110969 A1    Apr. 24, 2014

(51) Int. Cl.
*B62D 35/00*    (2006.01)
*B61D 17/02*    (2006.01)
*B61D 17/06*    (2006.01)

(52) U.S. Cl.
CPC ............ *B62D 35/001* (2013.01); *B62D 35/007* (2013.01); *B61D 17/02* (2013.01); *B61D 17/06* (2013.01); *Y02T 30/32* (2013.01); *Y10S 180/903* (2013.01)
USPC ...................... 296/180.1; 296/180.2; 180/903

(58) Field of Classification Search
USPC ..................... 296/180.1, 180.2, 180.4, 180.5; 105/1.1; 180/903
See application file for complete search history.

(56) References Cited

U.S. PATENT DOCUMENTS

| | | | |
|---|---|---|---|
| 4,257,641 A * | 3/1981 | Keedy | 296/180.4 |
| 4,818,015 A | 4/1989 | Scanlon | |
| 6,854,788 B1 * | 2/2005 | Graham | 296/180.4 |
| 8,382,194 B2 * | 2/2013 | Wood | 296/180.4 |
| 8,608,228 B2 * | 12/2013 | Visentin | 296/180.4 |
| 2011/0037291 A1* | 2/2011 | Pickering | 296/180.4 |
| 2013/0181478 A1* | 7/2013 | Litchfield | 296/180.4 |

FOREIGN PATENT DOCUMENTS

| | | |
|---|---|---|
| DE | 202010004371 U1 | 7/2010 |
| WO | 2010148508 A1 | 12/2010 |

OTHER PUBLICATIONS

International Search Report (Feb. 16, 2012) for corresponding International Application PCT/SE2011/000108.
International Preliminary Report on Patentability Sep. 5, 2013 for corresponding International Application PCT/SE2011/000108.

* cited by examiner

*Primary Examiner* — Glenn Dayoan
*Assistant Examiner* — Jason S Daniels
(74) *Attorney, Agent, or Firm* — WRB-IP LLP

(57) ABSTRACT

An aerodynamic device is arranged for mounting to a vehicle or a trailer for reducing its wind resistance. The aerodynamic device includes at least one sheet material arranged to be mounted to the vehicle/trailer and associated with a corresponding wall portion of the vehicle/trailer. Each wall portion has an outer surface and an inner surface and extends towards the rear of the vehicle/trailer. In a deployed first state, each sheet material is arranged to at least partly extend beyond a rearmost position of the wall portion. In a stored second state, each sheet material is arranged to be inserted such that is faces towards the inner surface. A vehicle or a trailer including the aerodynamic device is also provided.

8 Claims, 10 Drawing Sheets

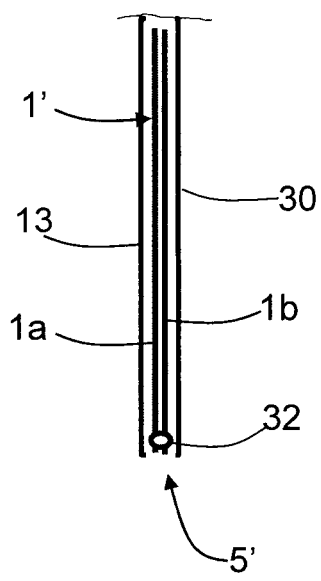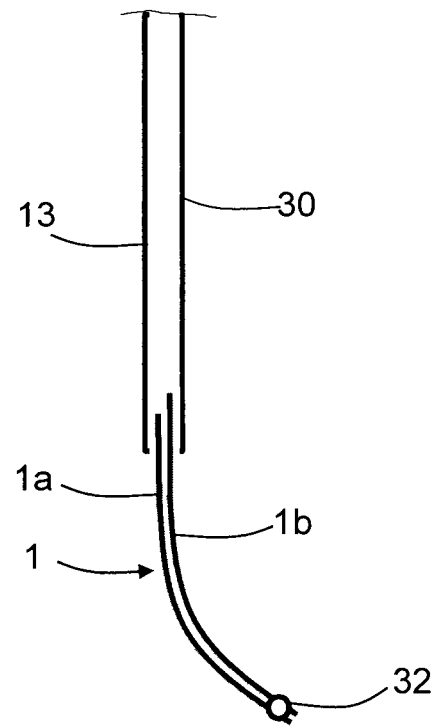
FIG. 8a                          FIG. 8b

AERODYNAMIC DEVICE FOR A VEHICLE

BACKGROUND AND SUMMARY

The invention relates to an aerodynamic device arranged for mounting to a vehicle or a trailer for reducing the wind resistance of the vehicle/trailer comprising a cargo space. The aerodynamic device comprises at least one sheet material, each sheet material being arranged to be mounted to the vehicle/trailer such that each sheet material is associated with a corresponding wall portion. Each wall portion has an outer surface and an inner surface, the inner surface facing the cargo space. The wall portion extends towards the rear of the vehicle/trailer, where, in a deployed first state, each sheet material is arranged to at least partly extend beyond a rearmost position of said wall portion.

The invention also relates to a vehicle or a trailer comprising said aerodynamic device.

In recent years, there has been an increased interest in improving the aerodynamic properties of vehicles in general. A major reason for this is the increased fuel costs and improving the aerodynamic properties of vehicles may reduce the fuel consumption and thus the fuel costs. In particular, professional companies in the transport and load carrying business feel an urge to keep down the fuel costs, therefore there is a desire among producers of load carrying vehicles to provide vehicles having a low fuel consumption. Many of the load carrying vehicles have a box shape such that its load compartment or trailer is essentially box shaped. There are certain benefits of this shape, in particular it is a suitable shape for managing to load as much as possible in the load compartment. However, the rear end of the load compartment will thus comprise right-angled edges, which results in that the rear end of the load compartment is not aerodynamically adapted.

In order to improve the aerodynamic properties and achieve a reduction of the wind resistance, the rear end of a trailer or load compartment has previously been modified in different ways. The use of rigid structures, e.g. air foils or the like devices, which are permanently mounted in order to improve the aerodynamic properties of a vehicle, are well known in the art. However, such structures are usually not convenient for trucks or trailers since they probably will get in the way for the doors to the loading compartment, which normally are arranged at the rear end of the load compartment. Hence, there would most probably be a need for such a structure to be easily detachable or to be mounted such that it does not interfere with the access to the load compartment through the door, e.g. by being mounted only to the doors.

However, these kinds of structures would add some length to the trailer/truck, and in many countries there are restrictions regarding the length of the vehicle such that the addition of an air foil may either make the vehicle too long or the load compartment itself smaller, i.e. shorter.

U.S. Pat. No. 4,142,755 discloses an assembly of air deflector shields surrounding the space between the tractor and the trailer, and a streamlined drag reducer shield at the rear end of the trailer whereby air drag in those regions is substantially decreased. The shields are removable to provide access to the trailer.

However, the shields have to be removed, and this is time-consumable, and requires direct handling of the large and probably dirty shields.

U.S. Pat. No. 4,818,015 discloses collapsible airfoils which reduce wind resistance for a vehicle in their operational positions, both at the front and at the rear of the vehicle. The airfoils may be moved to and from storing positions on the sides of the vehicle. Slide mechanisms for the folding of resilient airfoil sections are provided on the vehicle side walls.

However, when the rear airfoils are positioned at the storing positions on the sides at the rear of the vehicle, the vehicle width is affected, and furthermore the door opening capacity is reduced, normally the desired door opening angle is about 270°.

There is thus a desire to provide an aerodynamic device for a vehicle or a trailer, where the aerodynamic device is easily removed and re-installed without adding additional width to the vehicle, and without affecting the loading conditions i.e. not affecting the normal opening of the rear doors.

It is desirable to provide an aerodynamic device for a vehicle or a trailer, where the aerodynamic device is easily removed and reinstalled without adding additional width to the vehicle, and without affecting the loading conditions i.e. not affecting the normal opening of the rear doors.

According to an aspect of the present invention an aerodynamic device is arranged for reducing the wind resistance of the vehicle/trailer, which comprises a cargo space. The aerodynamic device comprises at least one sheet material, each sheet material being arranged to be mounted to the vehicle/trailer such that each sheet material is associated with a corresponding wall portion of the vehicle/trailer. Each wall portion has an outer surface and an inner surface, the inner surface facing the cargo space. The wall portion extends towards the rear of the vehicle/trailer, where, in a deployed first state, each sheet material is arranged to at least partly extend beyond a rearmost position of said wall portion.

In a stored second state, each sheet material is arranged to be inserted such that is faces towards the inner surface.

According to an example, the aerodynamic device comprises a first sheet material and a second sheet material. Each sheet material is arranged to be mounted to the vehicle/trailer such that the first sheet material is associated with a first wall portion of the vehicle and the second sheet material is associated with a second wall portion of the vehicle. The wall portions are mutually parallel, where the outer surfaces face away from each other and the inner surfaces face towards each other.

According to another example, the first sheet material comprises an outer edge, an inner edge, an upper edge and a lower edge. Furthermore, the second sheet material comprises an outer edge, an inner edge, an upper edge and a lower edge. The edges constitute borders of said sheet materials, where, in the deployed first state, the outer edges are closer to each other than the inner edges.

According to another example, the aerodynamic device comprises an upper sheet material which is arranged to be mounted to the vehicle/trailer such that it is associated with an upper wall portion which constitutes a roof.

According to another example, each sheet material comprises a first sub-sheet and a second sub-sheet. The first sub-sheet sheet is closer to the corresponding wall portion than the second sub-sheet, and the first sub-sheet and the second sub-sheet are connected to each other at the outer edge. The first sub-sheet is arranged to travel a longer distance than the second sub-sheet when said sheet material is moved from the stored second state to the deployed first state.

According, to another example, the sheet materials follow a curved shape in the deployed first state, constituting a mainly continuous extension of the corresponding tint wall portion, second wall portion and upper wall portion.

According to another example, each sheet material is arranged to be inserted between the corresponding wall portion and a corresponding inner wall portion.

A number of advantages are provided by means of the present invention. For example, a versatile aerodynamic device for a vehicle or a trailer, which is storable in such a way that the outer dimensions of the vehicle/trailer, and its normal workings such as cargo room door opening angles, are not affected.

BRIEF DESCRIPTION OF THE DRAWINGS

The present invention will now be described more in detail with reference to the appended drawings, where.

Figure 4:
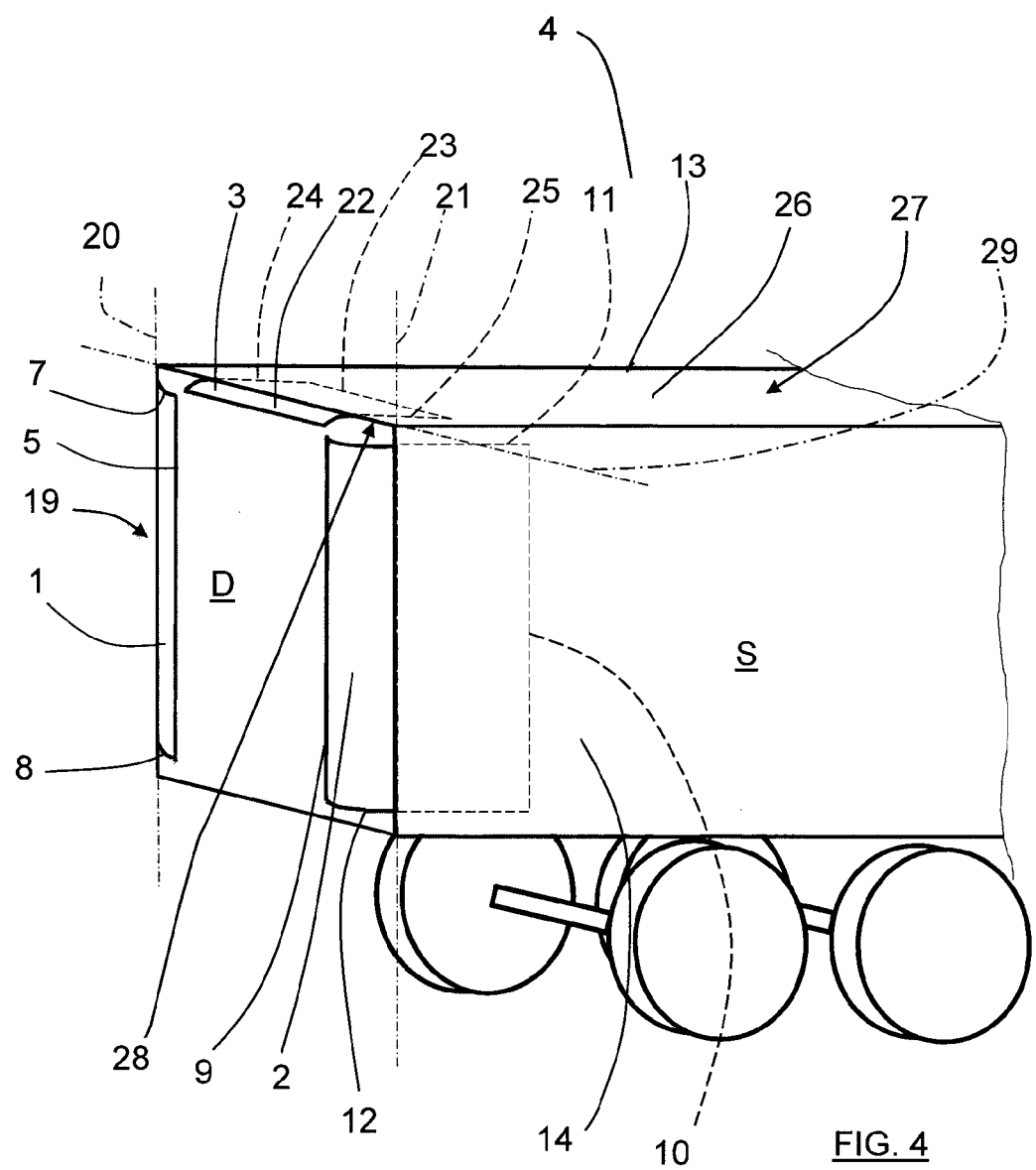
Figure 5:
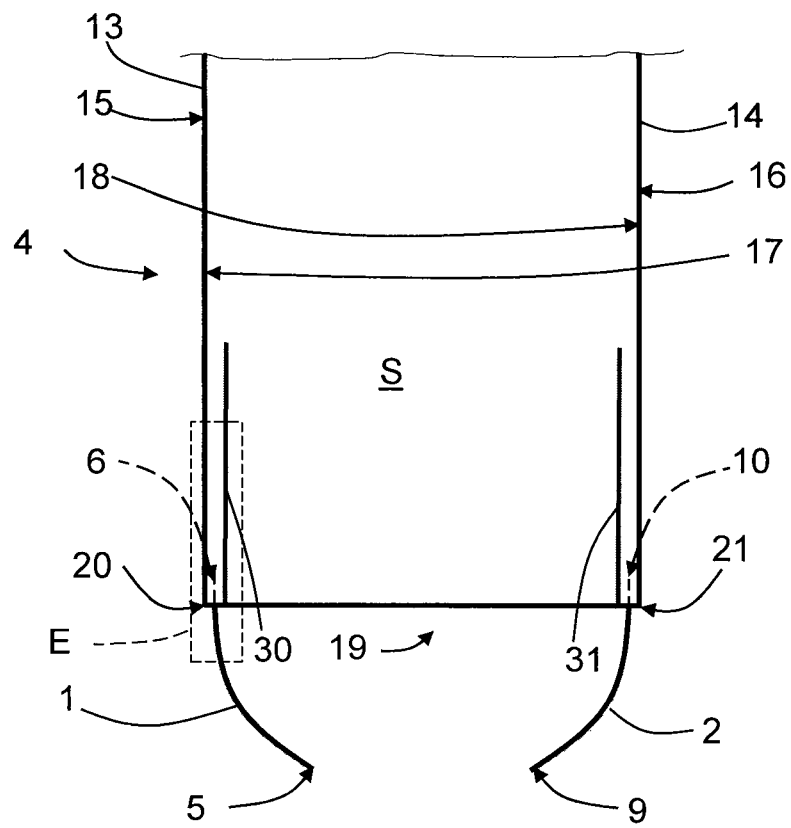
Figure 6:
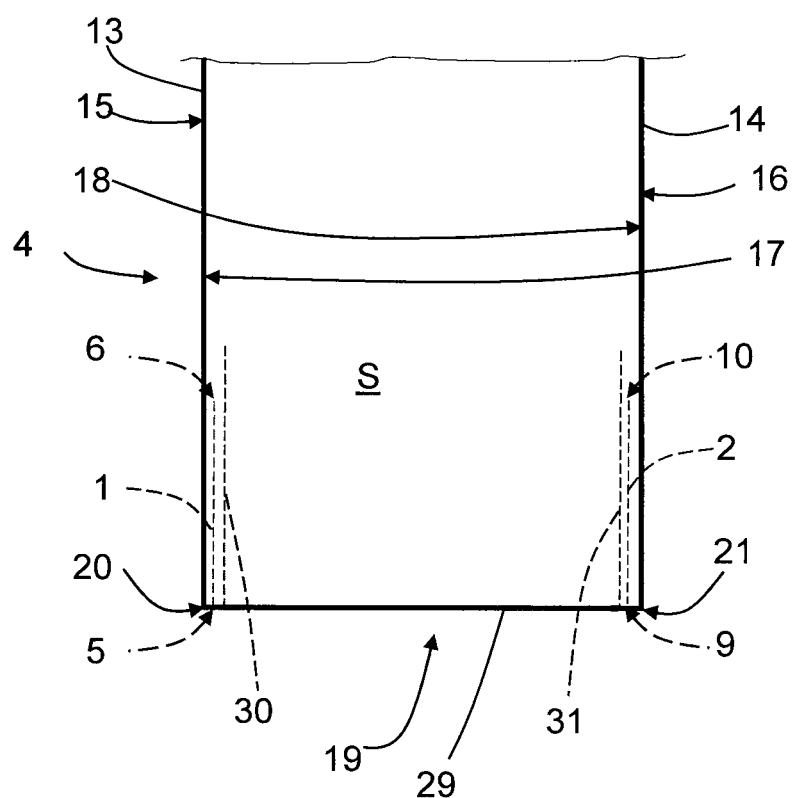
Figure 7A:
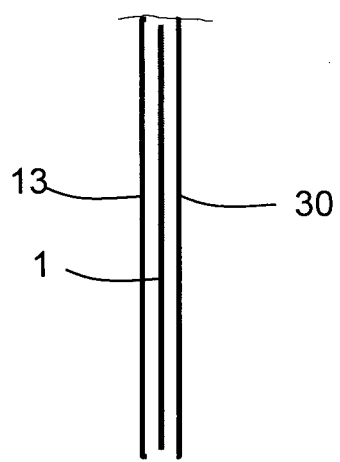
Figure 7B:
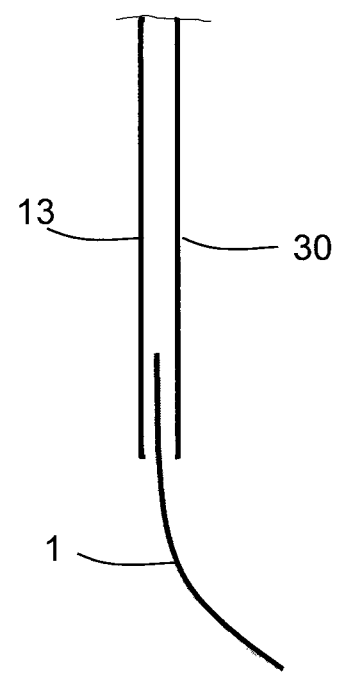
Figure 9:
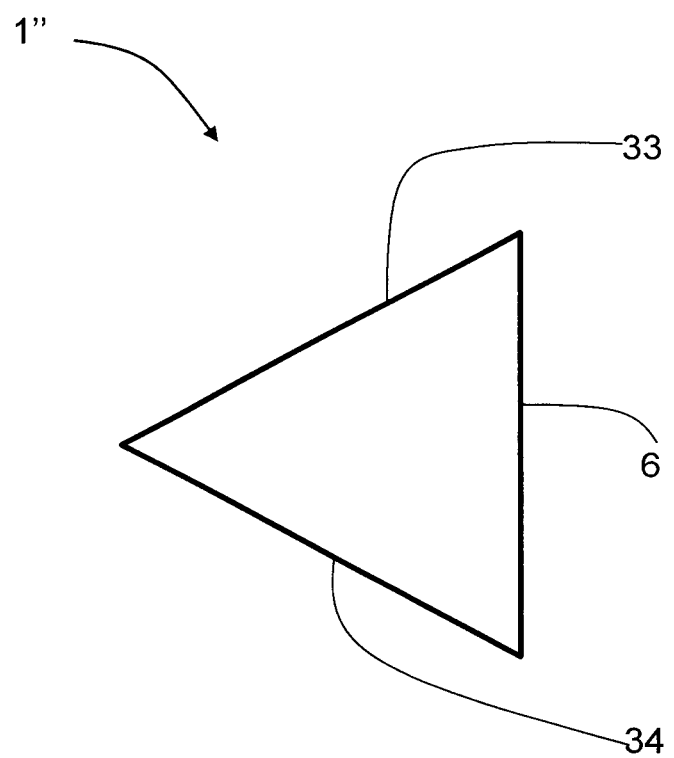
Figure 10:
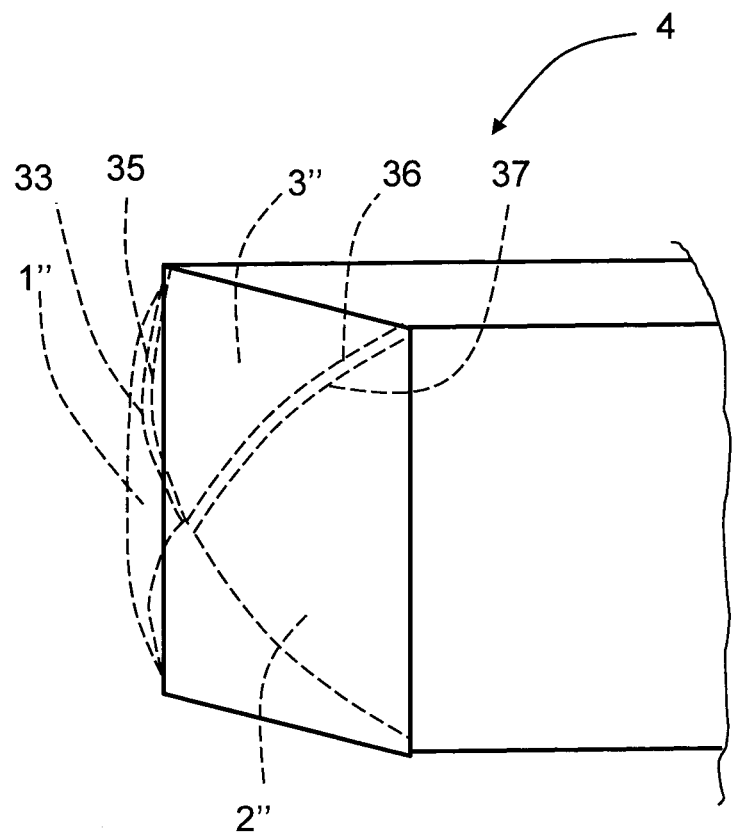

shows a schematic partial top view of the rear end of a truck with a typical aerodynamic device, where air streams are schematically indicated;

FIG. 4 shows a partial perspective view of the rear end of a truck with a aerodynamic device according to the present invention;

FIG. 5 shows a partial top view of the rear end of a truck with an aerodynamic device according to the present invention in a stored second state;

FIG. 6 shows a partial top view of the rear end of a truck with an aerodynamic device according to the present invention in a deployed first state;

FIG. 7a shows a partial top view of a part of a first wall portion with a first example of a sheet material of the aerodynamic device according to the present invention in a stored second state;

FIG. 7b shows a partial top view of a part of a first wall portion with a first example of a sheet material of the aerodynamic device according to the present invention in a deployed first state;

FIG. 8a shows a partial top view of a part of as first wail portion with a second example of a sheet material of the aerodynamic device according to the present invention in a stored second state;

FIG. 8b shows a partial top view of a part of a first wall portion with a second example of a sheet material of the aerodynamic device according to the present invention in a deployed first state;

FIG. 9 shows an alternative shape of a sheet material of the aerodynamic device according to the present invention; and FIG. 10 shows a partial perspective view of the rear end of a truck with a aerodynamic device according, to the present invention using the alternative shape shown in FIG. 9.

DETAILED DESCRIPTION

Figure 1:
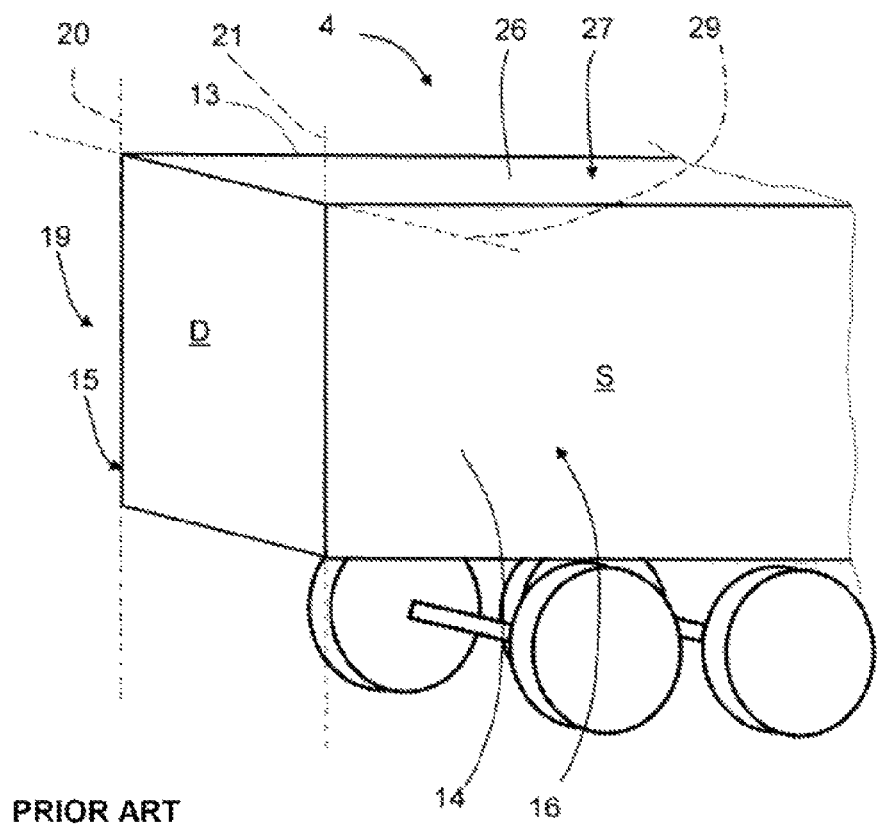
FIG. 1 shows a partial perspective view of the rear end of a truck without any aerodynamic device.

FIG. 1 shows a box-shaped rear end of an ordinary truck or a trailer 4, in the following the term truck will be used.

The truck 4 comprises a first wall portion 3, a second wall portion 14 and an upper wail portion 26, the first wall portion 13 and second wall portion 14 constituting side walls and the upper wall portion 26 constituting a roof. The wall portions 13, 14, 26 confine a cargo space S. The first wall portion 13 has an outer surface 15, an inner surface 17 and a rearmost edge portion 20; the second wall portion 14 has an outer surface 16, an inner surface 18 and a rearmost edge portion 21; and the upper wall portion 26 has an outer surface 27, an inner surface 28 and a rearmost edge portion 29. The first wall portion 13 and the second wall portion 14, constituting side walls, are mutually parallel where the outer surfaces 15, 16 face away from each other and the inner surfaces 17, 18 face each other.

Figure 2:
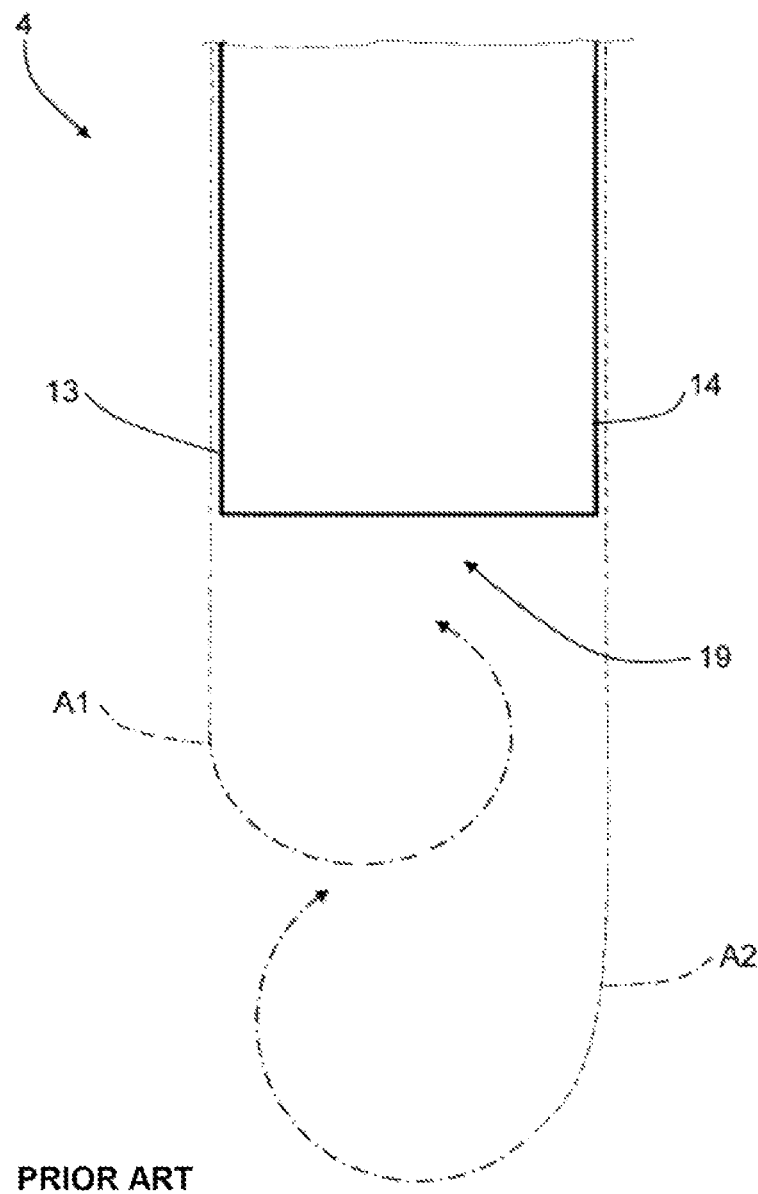
FIG. 2 shows a schematic partial top view of the rear end of a truck without any aerodynamic device, where air streams are schematically indicated.
Figure 3:
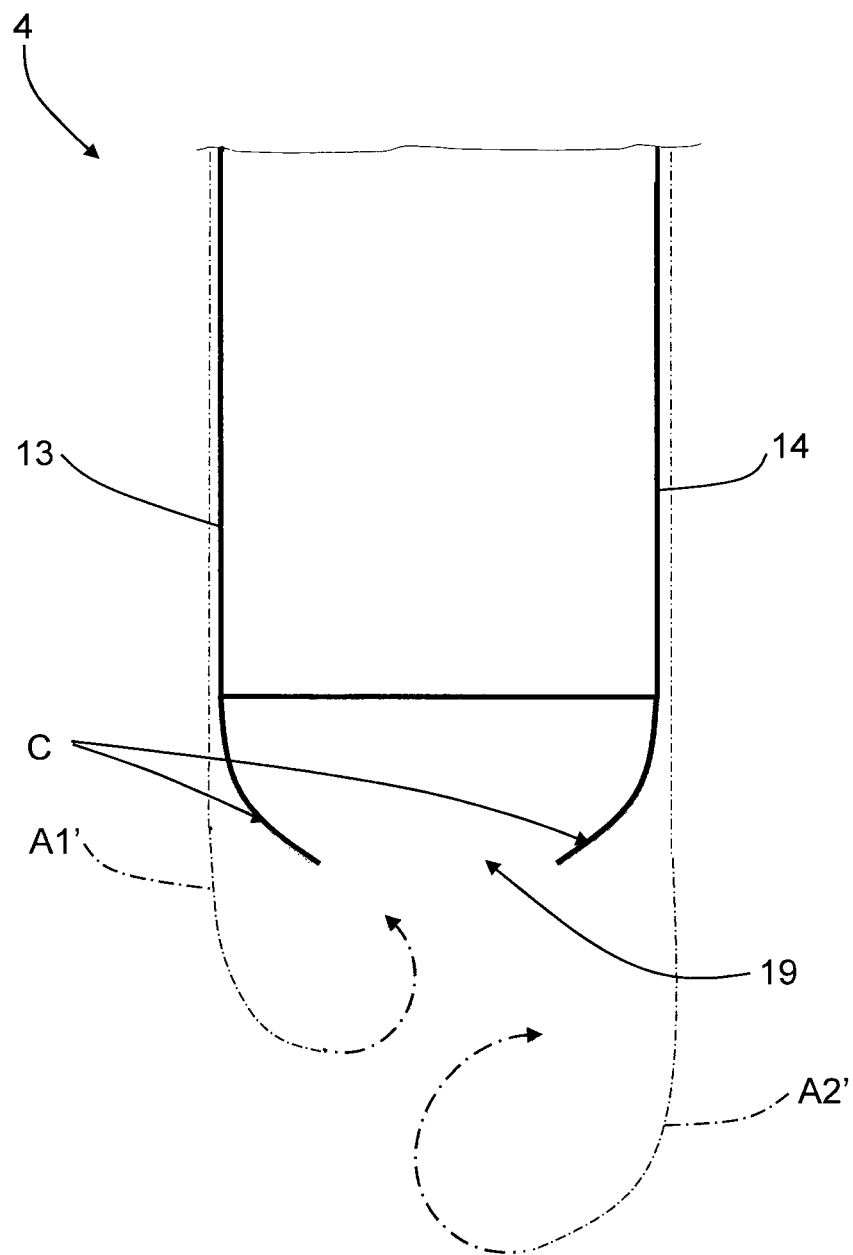

The edge portions 20, 21, 29 define sharp edges with right angles towards a door portion D, which sharp edges affect the airflow. FIG. 2 and FIG. 3 are used in the following general discussion regarding air flow or turbulence of air around the rear end of a truck, and how a typical aerodynamic device affects said air flow or turbulence of air.

FIG. 2 schematically shows a top view of the air flow or turbulence of air around the rear end of the truck 4 without any aerodynamic devices, when it is moving in a forward direction. The lengths of the arrows A1, A2 are intended to be proportional, to the drag resistance influencing the truck 4 when it is moving. The long arrows A1, A2 behind the rear end 19 of the truck 4 indicate a rather large drag resistance. The sharp edges 20, 21, 29 will result in sudden detachment of the air streaming along the first wall portion 13 and the second wall portion 14, and there will thus be a vacuum or a significant lower pressure at the rear end 19 of the truck 4 such that a large drag resistance is produced.

In FIG. 3, such a sudden detachment of the airstream along the first wall portion 13 and the second wall portion 14 is avoided by an aerodynamic device C of a common type. The aerodynamic device C will contribute to a better streamlining of the truck 4 at the rear end 19. Hence, there will be less vacuum or a not so significant lower pressure at the rear end of the truck and the air streaming along the first wall portion 13 and the second wall portion 14 of the truck 4 will more smoothly detach from the truck 4, as indicated by the shorter arrows A1', A2' corresponding to a lower drag resistance.

With reference to FIG. 4, an aerodynamic device according to the present invention will be described. The aerodynamic device comprises a first sheet material 1, a second sheet material 2, and an upper sheet material 3. Each sheet material 1, 2, 3 is mounted to the truck 4 such that the first sheet material 1 is associated with the first wall portion 13, the second sheet material 2 is associated with the second wall portion 14 and the upper sheet material 3 is associated with the upper wall portion 26.

The first sheet material 1 comprises an outer edge 5, an inner edge 6, an upper edge 7 and a lower edge 8; the second sheet material 2 comprises an outer edge 9, an inner edge 10, an upper edge 11 and a lower edge 12; and the upper sheet material 3 comprises an outer edge 22, an inner edge 23, a first side edge 24 and a second side edge 25. The edges 5, 6, 7, 8; 9, 10, 11, 12; 22, 23, 24, 25 constitute borders of said sheet materials 1, 2, 3.

In a deployed first state S1, as shown for the first sheet material 1 and the second sheet material 2 in FIG. 5, each sheet material 1, 2, 3 is arranged to at least partly extend beyond the rearmost position 20, 21, 29 of the wall portions 13, 14, 25. For the first sheet material 1 and the second sheet material, in the deployed first state S1, the outer edges 5, 9 are closer to each other than the inner edges 6, 10. As shown in FIG. 5 for the first sheet material 1 and the second sheet material 2, the sheet materials 1, 2, 3 follow a curved shape in the deployed first state (S1), constituting a mainly continuous extension of the corresponding first wall portion 13, the second wall portion 14 and the upper wall portion 26. The relatively small discontinuous step remaining at the edge portions 20, 21, 29 is disregarded, being considered to be too small to be of relevance.

According to the present invention, in a stored second state S2, as shown for the first sheet material 1 and the second sheet material 2 in FIG. 6, each sheet material 1, 2, 3 is arranged to be inserted such that is faces the corresponding inner surface 17, 18, 28. All sheet materials 1, 2, 3 are thus slided inside the truck 4, such that at least a corresponding major part of the sheet materials 1, 2, 3 is positioned within the confinement of the wall portions 13, 14, 26.

In this way, the sheet materials 1, 2, 3 may be removed in an efficient and easily handled manner. Furthermore, no width is added to the truck 4.

Preferably, as shown for the first sheet material 1 and the second sheet material 2 in FIG. 5 and FIG. 6, there are corresponding inner walls portions 30, 31 arranged such that each sheet material 1, 2 is arranged to be inserted between the corresponding wall portion 13, 14 and a corresponding inner wall portion 30, 31, which inner wall portions 30, 31 have a supporting function. Although not shown, a similar arrangement with an inner wall may be applicable for the upper sheet material 3 as well. Of course, alternative supporting means may be used, such as for example beams or wires.

FIG. 7a, FIG. 7b, FIG. 8a and FIG. 8b show an enlarged portion E indicated with dotted lines in FIG. 5. This enlarged portion shows examples of arrangements for the first sheet material 1, but the examples are of course applicable for all sheet materials 1, 2, 3.

With reference to FIG. 7a and FIG. 7b, the first sheet material is shifted between the deployed first state S1 as shown in FIG. 7a and the stored second state S2 as shown in FIG. 7b.

In this example, the first sheet material 1 is provided with a rigidity, for example by means of rigid structures, which makes it form a desired shape when it is in its deployed first state S1. The first sheet material 1 may thus take the curved shape shown in the deployed first state S1, but can be flattened to such an extent that it can be inserted to its stored second state S2.

With reference to FIG. 8a and FIG. 8b, the first sheet material V comprises a first sub-sheet 1a and a second sub-sheet 1b, the sub-sheets 1a, 1b being arranged in a parallel manner and fastened to each other at the outer edge 5 by means of a suitable fastening device 32. The first sub-sheet 1a is arranged to face the first wall portion 13. When the first sheet material V is retracted from its stored second state S2 as shown in FIG. 8b to its deployed first state S1 as shown in FIG. 8a, the first sub-sheet 1a is arranged to travel a longer distance than the second sub-sheet 1b. In this way, the first sheet material V will take the curved, shape shown in the deployed first state S1 in FIG. 8b.

The invention is not limited to the examples described, but may vary freely within the scope of the appended claims. For example, the sheet materials 1, 2, 3 may take the desired curved shape in the deployed first state S1 by means of attaching the outer edges to fixing points.

The sheet materials 1, 2, 3 have been described to have a rectangular shape, but other shapes are of curse conceivable. With reference to FIG. 9, the first sheet material 1" is shown having a triangular shape, comprising an inner edge 6, as first outer edge 33 and it second outer edge 34, where the outer edges are inclined with respect to the inner edge 6.

With all sheet materials having suitable triangular shapes as shown in FIG. 10, the first sheet material 1", the second sheet material 2" and the upper sheet material 3" may be retracted to the deployed first state S1 such that adjacent outer edges 33, 35; 36, 37 at least partly may be brought into contact, although this is not explicitly shown in FIG. 10 for reasons of clarity. In this way, a more coherent aerodynamic device is obtained. In order to improve the clarity in FIG. 10, the sheet materials 1", 2", 3" are shown transparent, denoted with dashed lines.

In order to achieve the above, one of two adjacent outer edges 33, 35; 36, 37 has to be slightly outwardly curved, but with the main triangular shape maintained, as can easily be understood. Although none of the outer edges 33, 34 in FIG. 9 is shown as curved, it should be understood that both these edges could be outwardly curved.

The truck may be any type of suitable vehicle.

The inner wall portions 30, 31 may have a limited extension with regard to the corresponding wall portions 13, 14 as shown in FIG. 5 and FIG. 6. It is also conceivable that each inner wall portion 30, 31 mainly have the same extension as the corresponding wall portion 13, 14, each inner wall portion 30, 31 and corresponding wall portion 13, 14 forming a double wall portion. This is of course applicable for the upper wall portion 26 as well, although no inner wall is shown for the upper wall portion in the Figures.

The invention claimed is:

1. An aerodynamic device arranged for mounting to a vehicle or a trailer for reducing the wind resistance of the vehicle/trailer comprising a cargo space, the aerodynamic device comprising at least one sheet material, each sheet material being arranged to be mounted to the vehicle/trailer such that each sheet material is associated with a corresponding wall portion of the vehicle/trailer, each wall portion having an outer surface and an inner surface, the inner surface facing the cargo space, the wall portion furthermore extending towards the rear of the vehicle/trailer, where, in a deployed first state, each sheet material is arranged to at least partly extend beyond a rearmost position of the wall portion, wherein in a stored second state, each sheet material is arranged to be inserted such that it faces towards the inner surface, the at least one sheet material comprising a first sheet material and a second sheet material, each sheet material being arranged to be mounted to the vehicle/trailer such that the first sheet material is associated with a first wall portion of the vehicle/trailer, and the second sheet material is associated with a second wall portion of the vehicle/trailer, the wall portions being mutually parallel, the outer surfaces facing, away from each other and the inner surfaces facing towards each other, each sheet material comprising a first sub-sheet and a second sub-sheet, where the first sub-sheet sheet is closer to the corresponding wall portion than the second sub-sheet, and where the first sub-sheet and the second sub-sheet are connected to each other at a rearmost edge, where furthermore the first sub-sheet is arranged to travel a longer distance than the second sub-sheet when the sheet material is moved from the stored second state to the deployed first state.

2. An aerodynamic device according to claim 1, wherein the first sheet material comprises an outer edge, an inner edge an upper edge and a lower edge, and that the second sheet material comprises an outer edge, an inner edge, an upper edge and a lower edge, the edges constituting borders of the sheet materials, where, in the deployed first state, the outer edges are closer to each other than the inner edges.

3. An aerodynamic device according to claim 1, wherein the aerodynamic device comprises an upper sheet material, the upper sheet material being arranged to be mounted to the vehicle/trailer such that it is associated with an upper wall portion which constitutes a roof.

4. An aerodynamic device according to claim 3, wherein the upper sheet material comprises an outer edge an inner edge, a first side edge and a second side edge, the edges constituting borders of the upper sheet material.

5. An aerodynamic device according to claim 1, wherein each sheet material is of a main triangular shape, comprising an inner edge, a first outer edge and a second outer edge, wherein the rearmost edge is an apex of the triangle.

6. An aerodynamic device according to claim 1, wherein each sheet material is provided with rigid structures which make each flexible sheet material form a desired shape when it is in its deployed state.

7. An aerodynamic device according to claim 1, wherein the sheet material in the deployed first state follows a curved shape, constituting a mainly continuous extension of the corresponding wall portion.

8. An aerodynamic device according to claim 1, wherein each sheet material is arranged to be inserted between the corresponding wall portion and a corresponding inner wall portion.

\* \* \* \* \*